(12) United States Patent
Golchha et al.

(10) Patent No.: US 9,372,840 B1
(45) Date of Patent: Jun. 21, 2016

(54) METHOD AND SYSTEM FOR ACCELERATED TRANSFORMATION OF CONTENT BASED ON PREDICTIVE CHUNKING

(71) Applicant: EMC Corporation, Hopkinton, MA (US)

(72) Inventors: Nitesh Golchha, Bangalore (IN); Vikram Bheemaiah, Bangalore (IN); Srinivas Veeravalli, Bangalore (IN); Derek Zasiewski, Oakville (CA)

(73) Assignee: EMC CORPORATION, Hopkinton, MA (US)

( * ) Notice: Subject to any disclaimer, the term of this patent is extended or adjusted under 35 U.S.C. 154(b) by 734 days.

(21) Appl. No.: 13/630,007

(22) Filed: Sep. 28, 2012

(51) Int. Cl.
*G06F 17/00* (2006.01)
*G06F 17/22* (2006.01)

(52) U.S. Cl.
CPC ........ *G06F 17/2264* (2013.01); *G06F 17/2247* (2013.01)

(58) Field of Classification Search
CPC .. G06F 17/21; G06F 17/2664; G06F 17/2247
USPC ................................................. 715/273, 235
See application file for complete search history.

(56) References Cited

U.S. PATENT DOCUMENTS

| | | | | |
|---|---|---|---|---|
| 5,737,599 | A * | 4/1998 | Rowe et al. | |
| 5,893,109 | A * | 4/1999 | DeRose | G06F 17/30905 |
| 6,817,791 | B2 * | 11/2004 | Klassen | 400/62 |
| 8,264,726 | B2 * | 9/2012 | Klassen | G06F 3/1285 358/1.15 |
| 2004/0197124 | A1 * | 10/2004 | Klassen | G06F 3/1211 400/70 |
| 2008/0288729 | A1 * | 11/2008 | Goel | G06F 17/21 |
| 2009/0161163 | A1 * | 6/2009 | Klassen et al. | 358/1.18 |
| 2010/0229086 | A1 * | 9/2010 | Howell et al. | 715/273 |
| 2012/0226823 | A1 * | 9/2012 | Livnat et al. | 709/246 |

* cited by examiner

*Primary Examiner* — Mohammed-Ibrahim Zuberi
(74) *Attorney, Agent, or Firm* — Dergosits & Noah LLP; Todd A. Noah

(57) ABSTRACT

A stored document is converted into a "web-friendly" format by dividing the conversion job into chunks. Each chunk specifies a subset of the document pages to be converted. The result of processing a chunk is a set of "web-friendly" page images. The page images are stored in a repository and are available for viewing at the client. The remaining chunks are processed in a similar manner. The perceived performance of the system is enhanced because a chunk can be processed much faster than the entire document. If the user happens to advance to a page in the document that is not yet processed, a real-time request is made to process a particular subset of pages that includes the page advanced to.

17 Claims, 6 Drawing Sheets

METHOD AND SYSTEM FOR ACCELERATED TRANSFORMATION OF CONTENT BASED ON PREDICTIVE CHUNKING

BACKGROUND

The present invention relates to the field of information technology, including, more particularly, to systems and techniques for document management.

Many companies turn to document management systems to help them store and manage their electronic documents. Some examples of documents can include contracts, pharmaceutical submissions (e.g., drug approval applications), product catalogs, data sheets, case files, product specifications, and customer communications—just to name a few examples. Indeed, there are statues and regulations that require companies to preserve certain documents.

Making a document imported into a repository available for viewing can take a significant amount of time. Generally, this is undesirable because users will not be able to view an imported document until the entire document has been processed. Additional hardware may, for example, speed the processing, but this can be a costly approach.

Thus, there is a need to provide efficient systems and techniques to improve the response times of document management systems.

DETAILED DESCRIPTION

Figure 1:
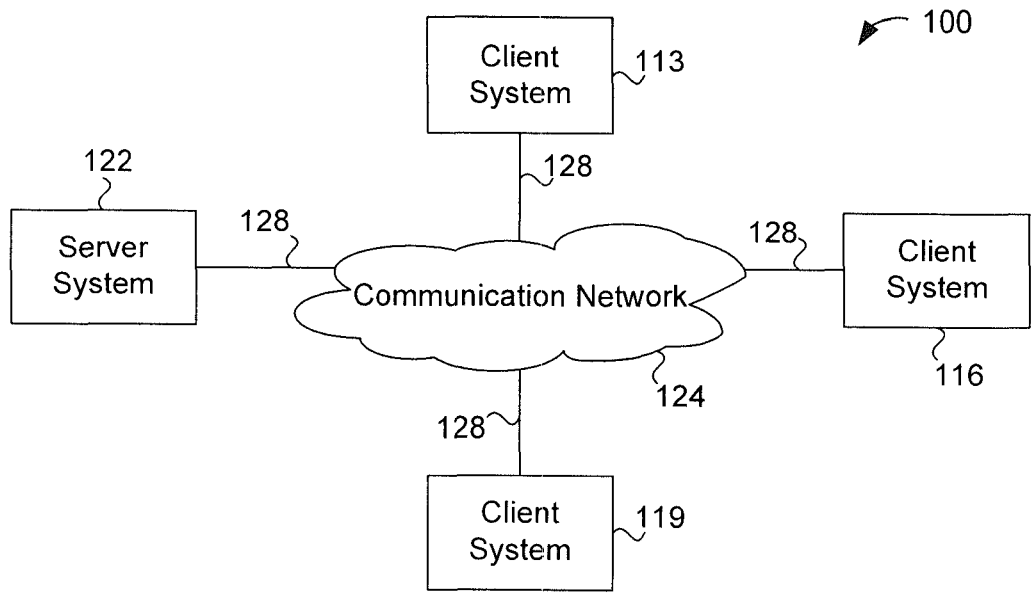
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
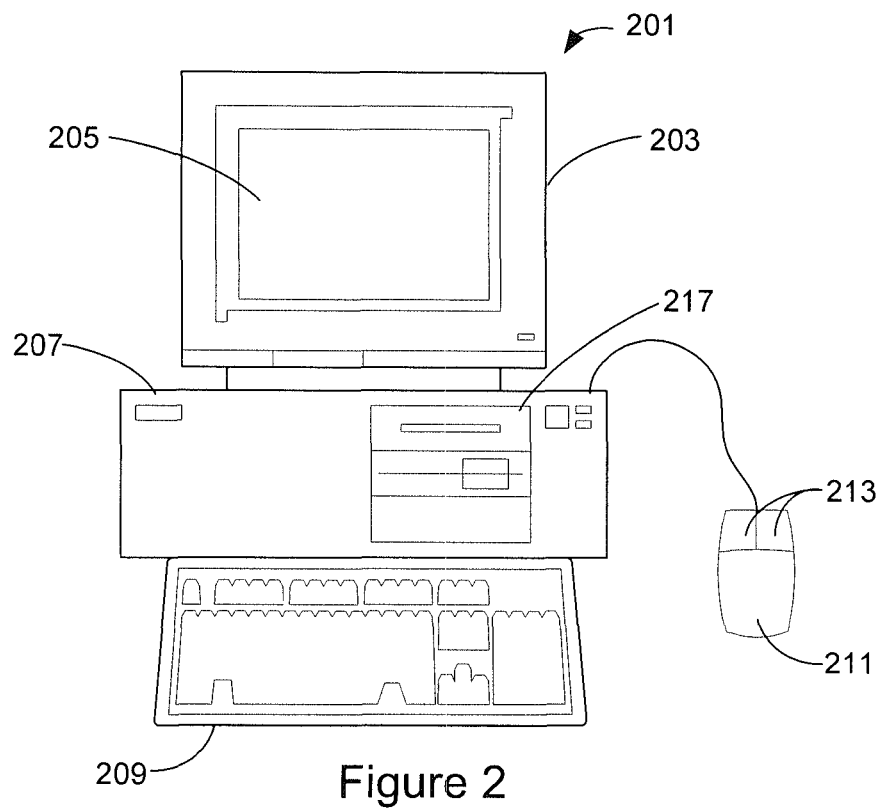
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
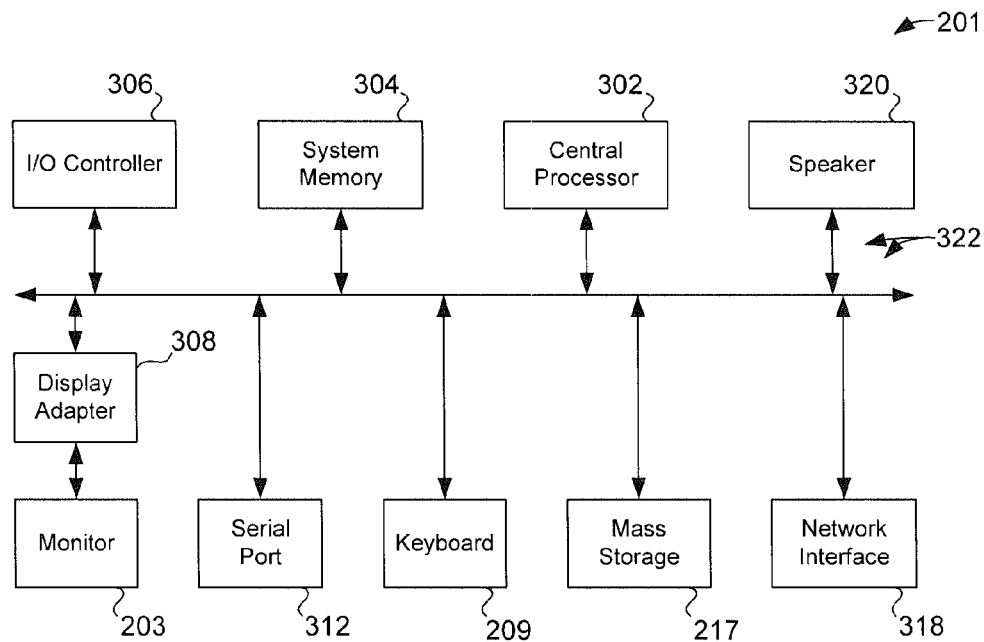
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
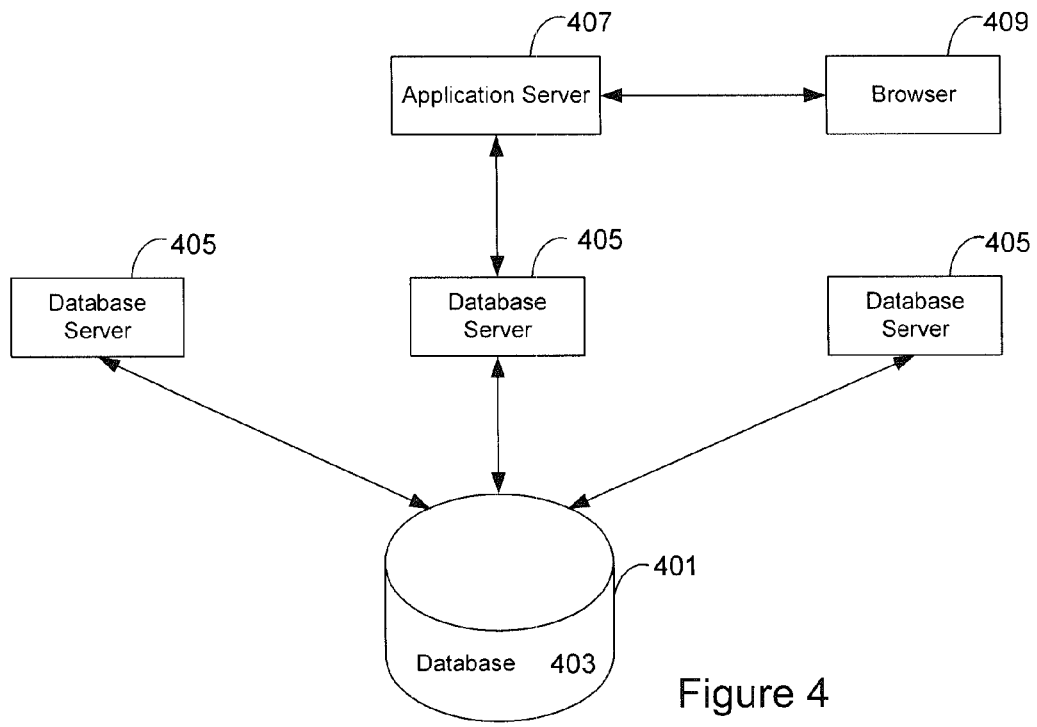
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
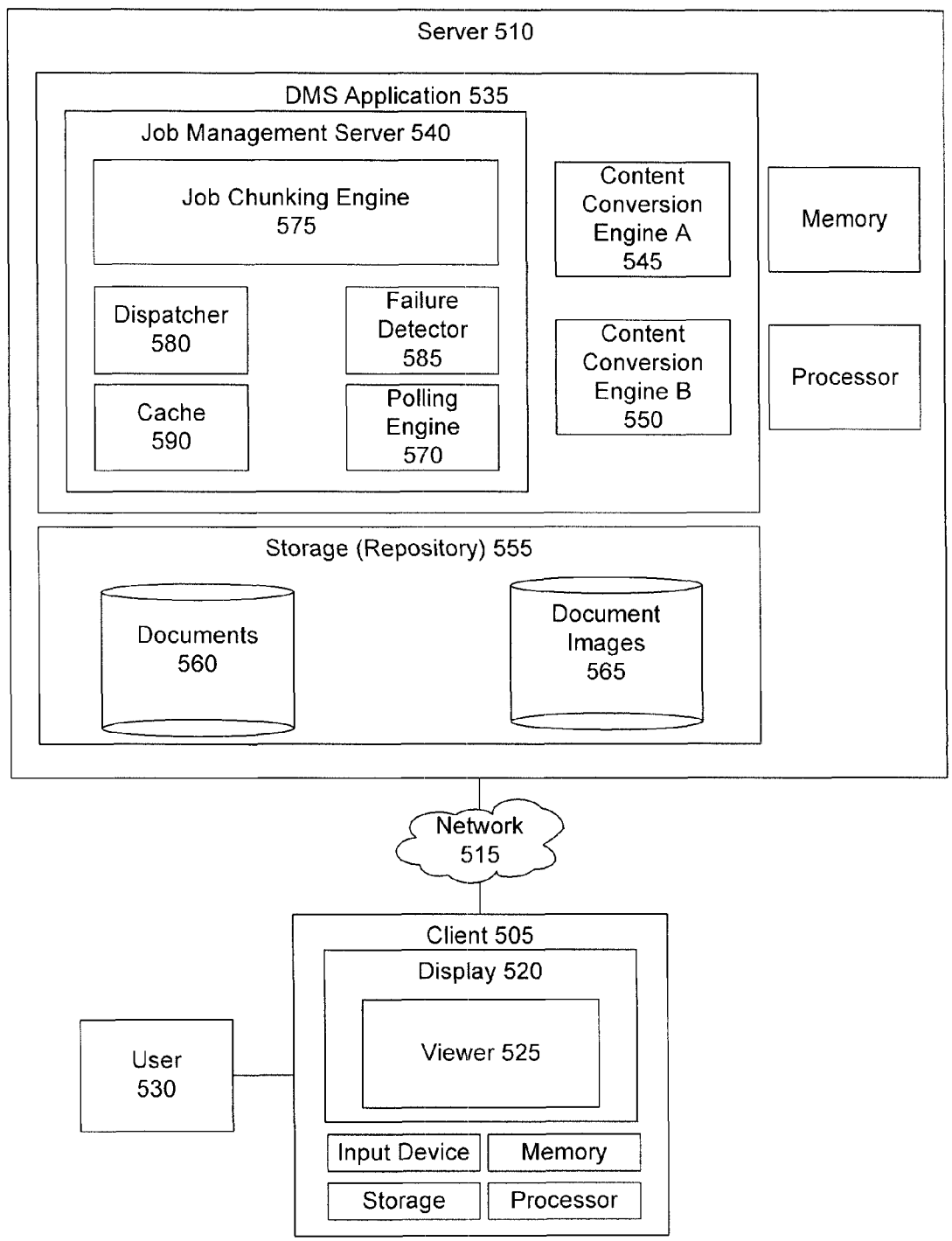
FIG. 5 shows a block diagram of a system for accelerated transformation of content based on predictive chunking.

FIG. 5 is a block diagram showing a system for document management. This system helps organizations such as companies, governments, and other entities track and store documents in a central repository. The documents are processed so that they can be viewed at client computers. An embodiment of the invention divides the processing job into a smaller set of chunks which allows a subset of pages of the document to be quickly processed and made available for viewing. This helps to improve the perceived performance of the system because a small chunk of the processing job can be processed much faster than the entire job.

With the advent of modern clients such as EMC Documentum xCP D2 and EMC Documentum Mobile (provided by EMC Corporation of Hopkins, Mass.), users have the ability to import content into the repository at a much more rapid pace than before. Given that the volume of such content is likely to be high, and also the fact that these documents are likely to be involved in workflows, the expectation is that reviewers of such documents expect to see up-to-date visual representation of content in a timely manner.

Many client applications are not capable of rendering the actual content representation in their user interfaces (UIs)—most applications do not deal with 3rd party, closed formats such as Microsoft Word (".doc"), Microsoft PowerPoint (".ppt"), and so forth, so there is an immediate need to create "web-friendly" renditions of such content. Generally, it is desirable that: (1) the rendition represents content in high-fidelity and (2) the rendition's size represents only a fraction of the size of the main content. When these goals are satisfied, the additional overhead of main content analysis and rendering becomes truly efficient and improves performance over the limited-bandwidth networks. This together with a divide-and-conquer approach plays a crucial role in a technique, as discussed in this patent application, to improve not only perceived but also true performance of the application.

In a specific implementation, to accomplish this, a service that may be referred to as Content Transformation Services (CTS) divides the job of creating storyboards for the whole document into chunks. It should be appreciated that a system of the invention may be known by any name or identifier, and this description is provided merely as a sample implementation.

In brief, in this specific implementation, each chunk is created and written to the repository separately by maintaining the page modifiers. This improves the perceived performance drastically. CTS also updates the primary rendition of the document with PageCount so that clients can anticipate and adjust their views accordingly. If a document does not have the latest rendition generated for the content and the user wishes the view it, then CTS can execute real-time requests and create renditions for any page-range requested by the client, thus providing real-time and load-balancing (for multiple CTS) capabilities to the client.

In this specific implementation, a chunk represents a single operation of creating a set of high-fidelity image renditions for main content with a pre-defined page range. Once created, it is written to the repository. Page modifiers are user-defined strings, assigned when the rendition is added to the primary content. Page modifiers are used in this situation to distinguish among the renditions. More specifically, it contains the page number of the original content. CTS adjusts the page modifiers according to the page numbers for asynchronous and synchronous requests. PageCount refers to the number of pages in the original content. Real-time requests represents an SBO exposed by CTS to clients. Clients can specify the page-range of the document for which they want storyboards to be generated and written to the repository. They can also specify other parameters like height, width, dots per inch (DPI), and so forth.

In a specific implementation, a feature of the invention includes a cache implementation. There is a chance that if no renditions are present for the content, there will be multiple real-time requests made for different page ranges. To accommodate this, CTS saves the content in a cache and uses this cache for multiple requests. This saves the time it takes to download the content onto the CTS server.

In a specific implementation, another feature of the invention includes plug-in failover. In this specific implementation, if there is a failure of a plug-in to process a job chunk, CTS hands over storyboard requests to other plug-ins. In case of a plug-in failure, CTS will hand over the request to another capable plug-in. CTS will specify the chunk number at which the failure occurred and the other capable plug-in will start chunking only from that chunk that caused the failure instead of from the start of the document. Hence, CTS is intelligent to handle such scenarios.

Referring now to FIG. 5, a system of the invention may include any number of clients, such as a client 505 and others. The clients access a server system 510 via a network 515. The network is as shown in FIG. 1 and described above. The clients are general purpose computers with hardware and software, such as shown in FIGS. 2-3 and described above. For example, client 505 includes a display 520, an application program 525, a processor, memory, storage, and an input device (e.g., mouse, keyboard, stylus, or touchscreen). The application program may be referred to as a viewer or document viewer program. The application program can request, receive, and process data from a user 530, the server system, or both. The data can be shown via the display.

Server system 510 includes components similar to the components shown in FIGS. 3-4 and described above. In a specific implementation, the server includes a document management application 535, a job management server 540, any number of content conversion or transformation engines (e.g., conversion engine A 545, or conversion engine B 550), memory, processor, and a repository or storage 555. There can be an application server (e.g., Web server) that is responsible for receiving requests from the clients and delivering documents and other data from storage to the clients. The repository includes databases 560 and 565.

Database 560 stores documents. The documents can include documents that have been uploaded or imported into the system from the clients. The documents can include documents created using word processing programs (e.g., Microsoft Word files, Corel WordPerfect files), presentation programs (e.g., Microsoft PowerPoint files), spreadsheet programs (e.g., Microsoft Excel files, Apple Numbers files), drawing programs (e.g., Microsoft Visio files, or Autodesk AutoCAD files), collaboration programs, note-taking programs (e.g., Microsoft OneNote), project management programs (e.g., Microsoft Project, or Oracle Primavera), or Adobe Acrobat or Reader (e.g., Portable Document Format (PDF) files) or TIFF files (e.g., single-page or multipage), or Open Office formatted files—just to name a few examples. Typically, the documents stored in database 560 will have been authored using third-party software (e.g., Microsoft Word) and will have a propriety format (e.g., ".doc" (Microsoft Word), ".ppt" (Microsoft PowerPoint), or ".xls" (Microsoft Excel)).

The content conversion engines are responsible for converting the documents stored in database 560 from a format not capable of being displayed by application or viewer program 525 into a format that is capable of being displayed by the application program. In a specific implementation, the format is an image file format (e.g., JPEG File Exchange Format). Other examples of image file formats include Exif (Exchangeable Image File Format), TIFF (Tagged Image File Format), GIF (Graphics Interchange Format), PNG (Portable Network Graphics), WebP, and others.

The converted documents are stored as document images or page images in database 565. The document images may be referred to as storyboards. In a specific implementation, there are at least two conversion engines. But, there can be any number of conversion engines such as three, four, five, six, seven, eight, nine, ten, or more than ten conversion engines. There can be a single conversion engine. The conversion engines are code modules. In a specific implementation, the conversion engines are implemented as plug-ins. A plug-in is a set of software components that adds specific abilities to a larger software application. It should be appreciated, however, that a code module may be implemented as an add-in, script, macro, library, or extension program.

In a specific implementation, application program or viewer program 525 is a Web browser application program. The user, through the Web browser, can view the images of documents stored in database 565. Aspects of the invention, however, may be implemented in any type of viewer program, not just a Web browser, that is capable of downloading and displaying the document images. The viewer may be implemented as a plug-in to the Web browser. The viewer may be an application program separate from the Web browser application program. The viewer may execute separately from the Web browser application program. The viewer may be installed separately from the browser. Typically, the viewer will be an application program that is different from the application program that the document was originally authored in. With the viewer installed at the client, the document can be viewed even if the application used to originally create or author the document is not installed at the client.

Job management server 540 is responsible for orchestrating processing jobs that transform (i.e., convert, or reformat) the documents in database 560 into document images that are then stored in database 565 for the clients to access. In a specific implementation, the job management server includes a polling engine 570, job chunking engine 575, dispatcher 580, failure detection module 585, and cache 590.

In a specific implementation, the polling engine 570 automatically polls or periodically checks document database 560 for documents that need to be converted. Upon finding a document, the server receives or retrieves (e.g., downloads) the document from the repository and begins the conversion processing job. The server stores or writes the results (i.e., document page images) in database 565 for the clients to access. In this specific implementation, the server automatically converts, i.e., without user interaction, the documents.

In another specific implementation, the server does not automatically convert the documents. In some cases, a user may not want every document in document database 560 to be automatically converted to images because of storage concerns. Depending on the type of document to be converted, the resulting document image may have a size (e.g., megabyte size) that is not that much less than the size of the document. In some cases, the document image size may be the same or greater than the size of the document. For example, a text-based PDF file uses a compression algorithm to help minimize the size of the file. Converting such a file to a JPEG rendition can result in the converted file having a much larger size than the original PDF file because raster data is less compressible than textual data. In this specific implementation, conversion may be "as-needed" rather than automatic. There can be a configurable option for a user (e.g., system administrator) to set whether or not document conversion is automatic.

Job chunking engine 575 divides the document conversion job into a set of chunks or job chunks. Each job chunk identifies a range of document pages. Dispatcher 580 dispatches, sends, or forwards the job chunks to the content conversion engines. The conversion engines return document page images which are then stored in document images database 565. Thus, the job chunks are processed separate from each other. A chunk of the conversion job can be processed faster than the entire job because the chunk is smaller than the entire job.

Failure detector module 585 is responsible detecting any failures by a content conversion engine to convert the document pages identified by a job chunk into page images. When a failure occurs, the failure detector module notifies the dispatcher. The dispatcher sends the job chunk to another conversion engine. The new conversion engine takes over the processing of the job chunk. Dividing the document processing job into chunks helps to reduce the impact of a conversion engine failure because the entire document will not have to be reprocessed. Instead, reprocessing can be limited to a particular job chunk.

Cache 590 provides a block of memory for storing a document retrieved from the repository. The cache can be used in cases of real-time requests to improve response time. For example, when a real-time request is received to convert certain pages of a document to page images, it is likely that there may be other requests to convert other pages of the document to page images. Storing the document in the cache helps the system to quickly service these other requests because the system will not have to retrieve the document from the repository. Rather, the system can retrieve the document from the cache.

Figure 6:
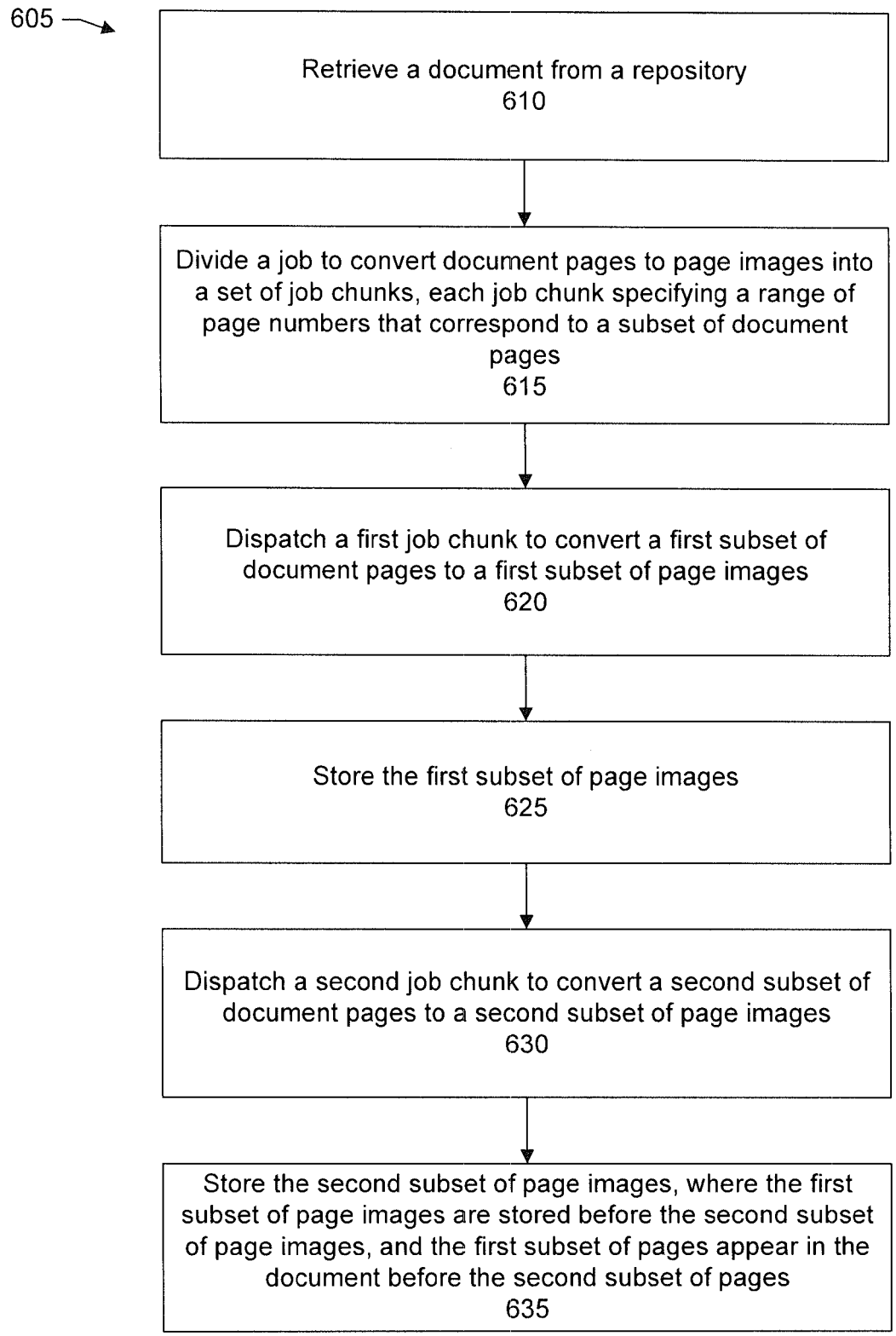
FIG. 6 shows an overall flow for chunking.

FIG. 6 shows an overall flow 605 for dividing a document conversion job into a set of job chunks. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 610, the system retrieves a document from a repository. For example, the document may be downloaded from documents database 560 (FIG. 5). In a step 615, the job chunking engine divides a job to convert the document pages to page images into a set of job chunks. Each job chunk specifies or identifies a range of page numbers that correspond to a subset of document pages.

In a specific implementation, a number of job chunks depends on a total number of pages in the document. In this specific implementation, the chunking engine determines the number of job chunks by dividing the total number of document pages by a predefined maximum number of pages per chunk. The job chunking engine distributes or assigns to each job chunk a range of document pages to be converted to a subset of page images. The number of pages in the range is based on the predefined maximum number of pages per job chunk.

Consider, as an example, a document having 60 pages to convert to page images, and a predefined maximum number of pages per chunk equal to 15. The number of job chunks would be 4 (i.e., 60 total document pages divided by 15 maximum pages per job chunk equals 4). Table A below shows the distribution of the 60 document pages spread out across the four job chunks.

TABLE A

| Job Chunk Number | Assigned Document Page Range |
|---|---|
| 1 | 1-15 |
| 2 | 16-30 |
| 3 | 31-45 |
| 4 | 46-60 |

As shown in Table A above, a first job chunk is assigned pages 1-15 of the document. A second job chunk is assigned pages 16-30 of the document. A third job chunk is assigned pages 31-45 of the document. A fourth job chunk is assigned pages 46-60 of the document. The page ranges are non-overlapping so that a document page will not be processed by multiple job chunks which can be inefficient.

If the total number of pages in the document is not a multiple of the predefined maximum number of pages per job chunk, the system determines the total number of job chunks by rounding up to the nearest integer (i.e., whole number).

Consider, as an example, a document having 65 pages, and where the predefined maximum number of pages per job chunk is again 15 pages. In this example, the result of dividing the total number of pages by the maximum number of pages per job chunk is a fraction or decimal or is not a whole number, (e.g., 65 total pages divided by 15 maximum pages per job chunk equals 4.3).

In this case, the total number of job chunks is determined by rounding the division result (i.e., quotient) up to the nearest whole number, the rounded result then being the total number of job chunks. In this example, the total number of job chunks would be 5. The job chunking engine would distribute to the first, second, third, and fourth job chunks document pages 1-15, 16-30, 31-45, and 46-60, respectively. The remaining document pages, i.e., pages 61-65, would be distributed to the fifth job chunk. In another specific implementation, the result may be rounded down. In this specific implementation, one of the job chunks would be assigned more pages than each of the other job chunks.

In a specific implementation, the value for the predefined maximum number of pages per job chunk is 15 pages. In this specific implementation, the value is set system-wide. Applicants have discovered that in certain situations a job chunk specifying a maximum of 15 pages provided a good balance. The value can range, however, from 5 pages to 25 pages. This includes, for example, 5, 6, 7, 8, 9, 10, 11, 12, 13, 14, 15, 16, 17, 18, 19, 20, 21, 22, 23, 24, or 25 pages. In a specific implementation, the customization of the number of pages per job chunk is at the level of the clients (or users) who can send a request to the system for any page range, e.g., pages 1-5 or pages 1-25.

In some implementations, the predefined maximum number of pages per job chunk is less than 5 pages. In other implementations, the predefined maximum number of pages per job chunk is greater than 25 pages. Factors influencing the predefined maximum number of pages per job chunk can include the type of document content (e.g., text or graphics), type of document format (e.g., tiff file or pdf file), available computing resources, and others. The predefined maximum number of pages per job chunk may be configurable such as by an administrator. This allows each organization to customize the system in a way that is most appropriate for their organization. In a specific implementation, the predefined maximum number of pages per job chunk may be automatically adjusted by the job chunking engine based on a pre-content analysis of the documents. This specific implementation includes logic to change the maximum number of pages per job chunk dynamically.

In a step 620, the dispatcher dispatches a job chunk to a conversion engine. For example, the dispatcher may dispatch the first job chunk (specifying pages 1-15) to the first conversion engine for the first conversion engine to covert a first subset of document pages (e.g., pages 1-15) to a first subset of page images. In a step 625, the server stores the first subset of page images in the repository such as in document image database 565 (FIG. 5). Once the page images have been stored in the repository, the page images will be available for the clients to access (e.g., view).

In a step 630, the dispatcher dispatches the second job chunk to convert a second subset of document pages (e.g., pages 16-30) to a second subset of page images. The dispatcher may dispatch the second job chunk to the same conversion engine (e.g., first conversion engine) or a different conversion engine (e.g., second conversion engine). In a specific implementation, requests are handed over to the first conversion engine (e.g., plug-in) that is listed in an XML configuration file. If the administrator changes the order of the conversion engines (e.g., plug-ins) in this configuration file by making the second plug-in in the list as the first, then the request will be handed over to it.

In a step 635, the server stores the second subset of page images in the repository. In a specific implementation, the first subset of page images are stored before the second subset of page images are stored, where the first subset of pages appear in the document before the second subset of pages appear in the document. Typically, a reading order of a document is in order of ascending page number. The reading order may be from left to right, top to bottom, or front to back. So, the system makes available those document pages that the user is likely to read first while continuing to process the other pages that the user is likely to read later. In other words, in this specific implementation, the system makes a prediction that the user will want to view the pages appearing in the document earlier before viewing pages appearing in the document later.

Referring now to steps 620 and 630, the dispatching or scheduling of the job chunks may proceed in parallel or in series (i.e., one-by-one) depending on factors such as the computing resources available, conversion engine throughput, latency, bandwidth, the number of conversion engines, current load on a conversion engine, desired response time, the particular application of the system, and the like. In a specific implementation, the dispatcher dispatches the job chunks according to a round-robin scheduling algorithm. Other examples of scheduling algorithms that may be used depending upon the application for which the system is designed include first in first out (FIFO), shortest remaining time, shortest job first (SJF), fixed priority pre-emptive scheduling, multilevel queue scheduling, and others.

In a specific implementation, the first job chunk is dispatched to the first conversion engine. After the first job chunk is dispatched, the second job chunk is dispatched to the same or different conversion engine. In another specific implementation, the first job chunk is dispatched to the first conversion engine. The second job chunk is not dispatched until the first conversion engine returns document page images. In another specific implementation, the first and second job chunks are dispatched concurrently or simultaneously to the same or different conversion engines.

As discussed above, a feature of the invention makes available those document pages a user is likely to read first while continuing to process the remaining document pages. In other words, during processing of the remaining document pages of a document, the user may be viewing other pages of the document. In a specific implementation, the dispatcher prioritizes the job chunk based on the order in which the pages specified by the job chunk appear in the document. In this specific implementation, a job chunk that specifies pages appearing earlier in the document has a higher priority than a job chunk that specifies pages appearing later in the document.

In this specific implementation, the system provides renditions of pages appearing earlier in the document before providing renditions of pages appearing later in the document. This technique allows the system to present the user with the page images they are likely to view first. The user can be viewing the initial pages while the system continues to process the remaining pages that appear after the initial pages. A job chunk with a higher priority may be processed before a job chunk with a lower priority. A job chunk with a higher priority may be dispatched to conversion engine with a high throughput while a job chunk with a lower priority may be dispatched to a conversion engine with a lower throughput.

Thus, in the example shown in Table A above, the first job chunk has a higher priority than the second, third, and fourth job chunks because pages 1-15 appear in the document before pages 16-30, 31-45, and 46-60. Pages 16-60 follow pages 1-15. In other words, pages 16-60 appear in the document after pages 1-15. The second, third, and fourth job chunks have a lower priority than the first job chunk. The second job chunk has a higher priority than the third and fourth job chunks because pages 16-30 appear in the document before pages 31-45 and 46-60. The third job chunk has a higher priority than the fourth job chunk because pages 31-45 appear in the document before pages 46-60.

It is not necessarily always the case, however, that pages appearing earlier in the document will have a priority over pages appearing later in the document. In another specific implementation, pages appearing later in the document have a higher priority than pages appearing earlier in the document. For example, in some cases a document, such as the-saurus, may include an index that is located at the back of the document. In this case, a user may want to first consult the index. So, the system can make available the index pages or portions of the document before making available the remaining pages or portions of the document.

Figure 7:
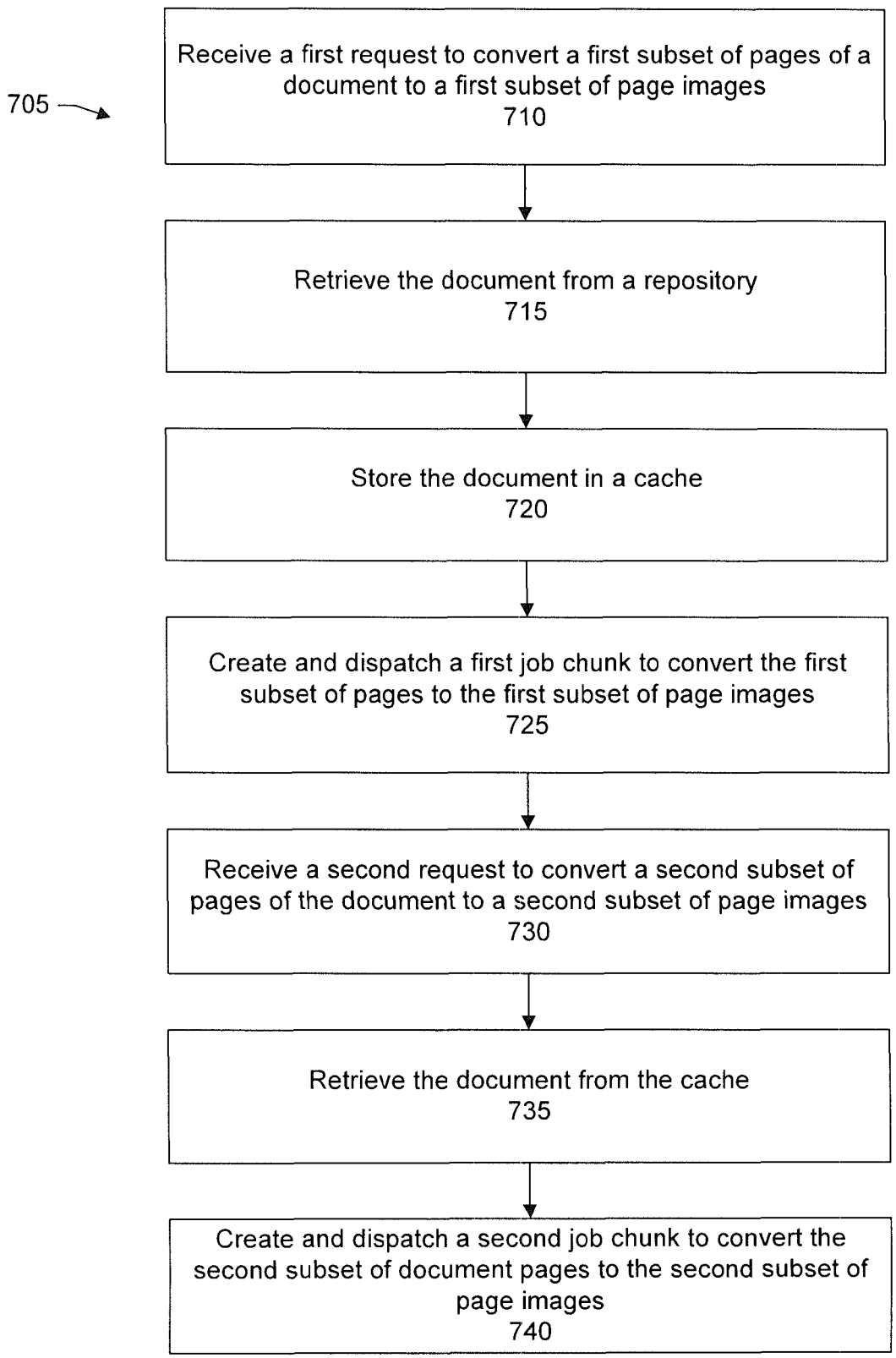
FIG. 7 shows an overall flow for servicing real-time page requests.

FIG. 7 shows a flow 705 of using a cache to process real-time requests. In a step 710, a first request is received to convert a first subset of document pages of a document to a first subset of page images. In a step 715, the document is retrieved from the repository.

In a step 720, the retrieved document is stored in a cache. The cache can be an area of storage or memory that is local to the job management server whereas the repository may be remote from job management server. In a step 725, the job management server creates and dispatches a first job chunk to convert the first subset of document pages to the first subset of page images.

In a step 730, a second request to convert a second subset of document pages of the document to a second subset of page images is received. In a step 735, the document is retrieved from the cache. In a step 740, a second job chunk is created and dispatched to convert the second subset of document pages to the second subset of page images.

Caching the document (step 720) allows the second request to be serviced very quickly because the document does not have to be downloaded from the repository. In other words, in this specific implementation, after retrieving the document from the repository to fulfill the first request, the system stores the document in a cache. This allows a future request (e.g., the second request) to be serviced by retrieving the cached document. For example, the repository may be at a remote location and connected to the job management server via a network. A document stored in the cache can be retrieved much faster than a document stored in the repository because the document will not have to be retrieved over the network.

In a specific implementation, converting documents to images is provided "on-demand" rather than provided automatically. This can help to conserve storage space. In this specific implementation, the order in which the various subsets of pages images are stored may not match the order in which the corresponding pages appear in the document because users may skip around to different parts of the document.

Thus, the second subset of document pages specified by the second job chunk may or may not be consecutive with the first subset of document pages specified by the first job chunk. In other words, the second subset of document pages may or may not follow the first subset of document pages. The first job chunk may specify a first sequential listing or range of document pages. The second job chunk may specify a second sequential listing or range of document pages. The second sequential listing may or may not follow the first sequential listing. There may be a gap of pages between the first and second sequential page listings. The first subset of pages may appear in the document before or after the second subset of pages appear in the document. For example, the first subset of pages may include pages 55-60 and the second subset of pages may include pages 25-30.

Figure 8:
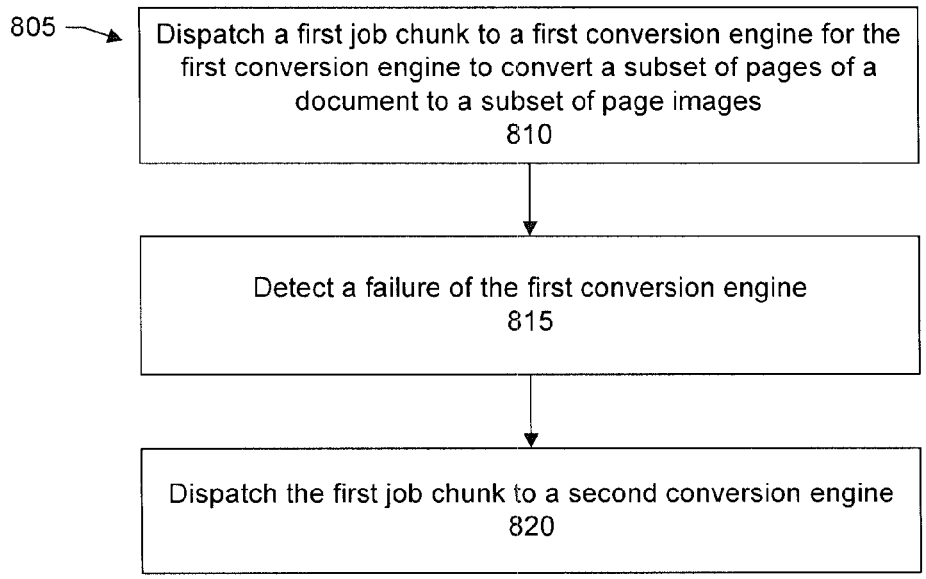
FIG. 8 shows an overall flow for conversion failover.

FIG. 8 shows a flow 805 for failover. In a step 810, the dispatcher dispatches a first job chunk to a first conversion engine for the first conversion engine to convert a subset of document pages to a subset of page images. In a step 815, the failure detection module detects a failure of the first conversion engine to properly convert the document pages to page images. The failure detection module notifies the dispatcher. In a step 820, the dispatcher dispatches the first job chunk to a second conversion engine, different from the first conversion engine, for the second conversion engine to convert the subset of document pages to the subset of page images.

Because the document processing job has been divided into a set of job chunks, the second conversion engine does not have to start processing or reprocessing at the beginning of the document. Rather, the second conversion engine can process just the subset of pages specified by the first job chunk.

Figure 9:
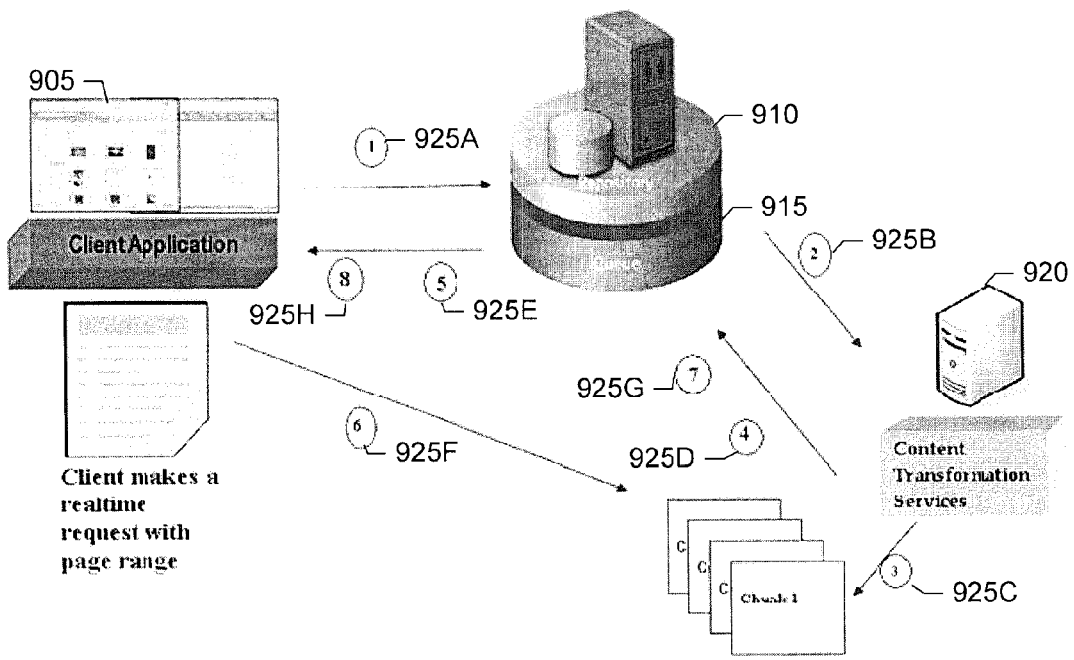
FIG. 9 shows a specific implementation of a system and workflow for accelerated transformation of content based on predictive chunking.

FIG. 9 shows a specific implementation of a system for predictive chunking. In this specific implementation, the system includes a client application 905, a repository 910, a queue 915, and content transformation services (CTS) 920. In a step 925A, the client imports a document to the repository. This creates a queue item. In a step 925B, CTS polls the queue, finds an item present in the table and downloads it. In a step 925C, using third party plug-ins, CTS creates first chunk of 15 image renditions of the main content. In a step 925D, once the first chunk is created, CTS writes them to the repository. In a step 925E, users can view the first 15 storyboards of the main content. Steps 925D and 925E occur iteratively till all the storyboards are created for the document.

In a step 925F, user scrolls down to view a page that has yet not been rendered by CTS, such as page number 27. Hence, the client sends a real-time request to CTS with a page range of, for example, 25-30. In a specific implementation, the upper limit of the page range is calculated by adding three pages to the page number that the user advanced or jumped to (e.g., page 27 plus 3 pages equals page 30). The lower limit of the page range is calculated by subtracting two pages from the page number that the user advanced to (e.g., page 27 minus 2 pages equals page 25). The system processes the other pages (e.g., pages 25-26 and pages 28-30) in anticipation that the user may want to view pages that are around or near the page the user advanced to (e.g., page 27). It should be appreciated that in other implementations, different values may be used to calculate the upper and lower page range limits as long as the advanced to page number falls within the upper and lower page range limits.

In this specific implementation, the CTS load balancer will choose the least busy CTS instance and dispatch the job there. From there selected CTS instance creates storyboards for only the specified page range. In a step 925G, CTS writes the renditions to the repository. In a step 925H, user can view the storyboards.

Transforming the entire document as a whole can result in users having to 1) wait till all the renditions of the content are generated, 2) see an earlier rendition of the content (if available), or 3) see nothing. Predictive chunking as described in this patent application provides a more efficient solution. In a specific implementation, as soon as the document is available, CTS starts chunking. Since the first chunk will be finished much faster and written to the repository, the perceived performance is enhanced and user is able to view the document content.

In this specific implementation, in case if the content is not available, then clients can make real-time requests to CTS with a specified page range. CTS responds by creating storyboards for only the page range specified and user is able to view the content in real-time. Again, the perceived performance is improved, making the user believe that the content rendition is available. In a specific implementation, this step utilizes the load balancing capability of CTS real time calls assuming there is more than one instance of CTS in a given cluster.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
   receiving a document having a plurality of pages from a repository;
   dividing a job to convert the plurality of pages to a plurality of page images into a plurality of created job chunks, each created job chunk specifying a range of increasing page numbers that correspond to a subset of the plurality of pages;
   dispatching a first created job chunk to convert a first subset of pages in a first range of increasing page numbers to a first subset of page images;
   storing the first subset of page images in the repository;
   dispatching a second created job chunk to convert a second subset of pages in a second range of increasing page numbers to a second subset of page images;
   storing the second subset of page images in the repository, wherein the first subset of page images are stored in the repository before the second subset of page images are stored in the repository, and the first subset of pages appear in the document before the second subset of pages appear in the document;
   receiving a real-time user request to convert a specific page to a page image;
   creating and dispatching a third job chunk to convert a third subset of pages, in a third range of increasing page numbers which ranges from at least one page before the user-requested specific page to at least one page after the user-requested specific page, to a third subset of page images, which ranges from at least one page image before the page image to at least one page image after the page image, before dispatching a previously created fourth job chunk to convert a fourth subset of pages in a fourth range of increasing page numbers comprising the specific page to a fourth subset of pages images; and
   storing the third subset of page images in the repository, wherein the first created job chunk specifies the first range of increasing page numbers, the second created job chunk specifies the second range of increasing page numbers, the third created job chunk specifies the third range of increasing page numbers, the second range of increasing page numbers directly follows the first range of increasing page numbers, and at least one page number exists between the second range of increasing page numbers and the third range of increasing page numbers.

2. The method of claim 1 wherein a number of the plurality of job chunks is equal to a value obtained by dividing a total number of pages in the document with a predefined maximum number of pages for a job chunk; and
   if the value is not a whole number, rounding the value up to a nearest whole number.

3. The method of claim 2 wherein the predefined maximum number of pages for a job chunk is 15 pages.

4. The method of claim 2 wherein the predefined maximum number of pages for a job chunk ranges from 5 pages to 25 pages.

5. The method of claim 1 comprising:
   dispatching a fourth job chunk to a first conversion module to convert a fourth subset of pages to a fourth subset of page images;
   detecting a failure of the first conversion module to convert the fourth subset of pages; and
   upon the detecting a failure, dispatching the fourth job chunk to a second conversion module, different from the first conversion module, to convert the fourth subset of pages.

6. The method of claim 1 comprising:
   after the retrieving a document, storing the document in a cache.

7. A computer program product, comprising a non-transitory computer-readable medium having a computer-readable program code embodied therein, the computer-readable program code adapted to be executed by one or more processors to implement a method comprising:
   receiving a document having a plurality of pages from a repository;
   dividing a job to convert the plurality of pages to a plurality of page images into a plurality of created job chunks, each created job chunk specifying a range of increasing page numbers that correspond to a subset of the plurality of pages;
   dispatching a first created job chunk to convert a first subset of pages in a first range of increasing page numbers to a first subset of page images;
   storing the first subset of page images in the repository;
   dispatching a second created job chunk to convert a second subset of pages in a second range of increasing page numbers to a second subset of page images;
   storing the second subset of page images in the repository, wherein the first subset of page images are stored in the repository before the second subset of page images are stored in the repository, and the first subset of pages appear in the document before the second subset of pages appear in the document;
   receiving a real-time user request to convert a specific page to a page image;
   creating and dispatching a third job chunk to convert a third subset of pages, in a third range of increasing page numbers which ranges from at least one page before the user-requested specific page to at least one page after the user-requested specific page, to a third subset of page images, which ranges from at least one page image before the page image to at least one page image after the page image, before dispatching a previously created fourth job chunk to convert a fourth subset of pages in a fourth range of increasing page numbers comprising the specific page to a fourth subset of pages images; and storing the third subset of page images in the repository, wherein the first created job chunk specifies the first range of increasing page numbers, the second created job chunk specifies the second range of increasing page numbers, the third created job chunk specifies the third range of increasing page numbers, the second range of increasing page numbers directly follows the first range of increasing page numbers, and at least one page number exists between the second range of increasing page numbers and the third range of increasing page numbers.

8. The computer program product of claim 7 wherein a number of the plurality of job chunks is equal to a value obtained by dividing a total number of pages in the document with a predefined maximum number of pages for a job chunk; and if the value is not a whole number, rounding the value up to a nearest whole number.

9. The computer program product of claim 8 wherein the predefined maximum number of pages for a job chunk is 15 pages.

10. The computer program product of claim 8 wherein the predefined maximum number of pages for a job chunk ranges from 5 pages to 25 pages.

11. The computer program product of claim 7 wherein the method comprises:
dispatching a fourth job chunk to a first conversion module to convert a fourth subset of pages to a fourth subset of page images;
detecting a failure of the first conversion module to convert the fourth subset of pages; and
upon the detecting a failure, dispatching the fourth job chunk to a second conversion module, different from the first conversion module, to convert the fourth subset of pages.

12. The computer program product of claim 7 wherein the method comprises:
after the retrieving a document, storing the document in a cache.

13. A system for previewing a document modification, the system comprising:
a processor-based database management system executed on a computer system and configured to:
receive a document having a plurality of pages from a repository;
divide a job to convert the plurality of pages to a plurality of page images into a plurality of created job chunks, each created job chunk specifying a range of increasing page numbers that correspond to a subset of the plurality of pages;
dispatch a first created job chunk to convert a first subset of pages in a first range of increasing page numbers to a first subset of page images;
store the first subset of page images in the repository;
dispatch a second created job chunk to convert a second subset of pages in a second range of increasing page numbers to a second subset of page images;
store the second subset of page images in the repository, wherein the first subset of page images are stored in the repository before the second subset of page images are stored in the repository, and the first subset of pages appear in the document before the second subset of pages appear in the document;
receive a real-time user request to convert a specific page to a page image;
create and dispatching a third job chunk to convert a third subset of pages, in a third range of increasing page numbers which ranges from at least one page before the user-requested specific page to at least one page after the user-requested specific page, to a third subset of page images, which ranges from at least one page image before the page image to at least one page image after the page image, before dispatching an already created fourth job chunk to convert a fourth subset of pages in a fourth range of increasing page numbers comprising the specific page to a fourth subset of pages images; and
store the third subset of page images in the repository, wherein the first created job chunk specifies the first range of increasing page numbers, the second created job chunk specifies the second range of increasing page numbers, the third created job chunk specifies the third range of increasing page numbers, the second range of increasing page numbers directly follows the first range of increasing page numbers, and at least one page number exists between the second range of increasing page numbers and the third range of increasing page numbers.

14. The system of claim 13 wherein a number of the plurality of job chunks is equal to a value obtained by dividing a total number of pages in the document with a predefined maximum number of pages for a job chunk; and
the processor-based database management system is configured to round the value up to a nearest whole number if the value is not a whole number.

15. The system of claim 14 wherein the predefined maximum number of pages for a job chunk is 15 pages.

16. The system of claim 14 wherein the predefined maximum number of pages for a job chunk ranges from 5 pages to 25 pages.

17. The system of claim 13 wherein the processor-based database management system is configured to:
dispatch a fourth job chunk to a first conversion module to convert a fourth subset of pages to a fourth subset of page images;
detect a failure of the first conversion module to convert the fourth subset of pages; and
upon the detection of the failure, dispatch the fourth job chunk to a second conversion module, different from the first conversion module, to convert the fourth subset of pages.

* * * * *